(12) United States Patent
Takehara et al.

(10) Patent No.: US 12,096,007 B2
(45) Date of Patent: Sep. 17, 2024

(54) IMAGE CONVERSION APPARATUS AND IMAGE DECODING APPARATUS

(71) Applicant: JVCKENWOOD Corporation, Yokohama (JP)

(72) Inventors: Hideki Takehara, Yokohama (JP); Hiroya Nakamura, Yokohama (JP); Satoru Sakazume, Yokohama (JP); Shigeru Fukushima, Yokohama (JP); Toru Kumakura, Yokohama (JP); Hiroyuki Kurashige, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 214 days.

(21) Appl. No.: 17/698,351

(22) Filed: Mar. 18, 2022

(65) Prior Publication Data
US 2022/0217362 A1    Jul. 7, 2022

Related U.S. Application Data

(63) Continuation of application No. PCT/JP2020/035430, filed on Sep. 18, 2020.

(30) Foreign Application Priority Data

Sep. 20, 2019  (JP) ................................. 2019-171791

(51) Int. Cl.
*H04N 19/176* (2014.01)
*H04N 19/117* (2014.01)
(Continued)

(52) U.S. Cl.
CPC ......... *H04N 19/176* (2014.11); *H04N 19/117* (2014.11); *H04N 19/119* (2014.11);
(Continued)

(58) Field of Classification Search
CPC .. H04N 19/176; H04N 19/117; H04N 19/119; H04N 19/174; H04N 19/188; H04N 19/436; H04N 19/70; H04N 19/82
(Continued)

(56) References Cited

U.S. PATENT DOCUMENTS

2020/0267412 A1* 8/2020 Karczewicz ........... H04N 19/61

OTHER PUBLICATIONS

International Search Report for the corresponding PCT Application No. PCT/JP2020/035430 with English translation, mailed Dec. 15, 2020, 11 pages.
(Continued)

*Primary Examiner* — Dominic D Saltarelli
(74) *Attorney, Agent, or Firm* — Shih IP Law Group, PLLC

(57) ABSTRACT

An image conversion apparatus adapted to convert a coded picture that includes a slice including an integer number of rectangular areas each including a collection of one or more rows of blocks, the blocks being derived from dividing an image into blocks of a predetermined size, is provided. The apparatus converts the coded picture so as to reconfigure a relationship between the slice and the rectangular areas included in the coded picture, when a slice boundary and a rectangular area boundary in the coded picture are equal in terms of whether to apply a loop filter and converts the coded picture so as not to change the relationship between the slice and the rectangular areas included in the coded picture when the slice boundary and the rectangular area boundary in the coded picture are not equal in terms of whether to apply a loop filter.

2 Claims, 13 Drawing Sheets

(51) Int. Cl.
*H04N 19/119* (2014.01)
*H04N 19/169* (2014.01)
*H04N 19/174* (2014.01)
*H04N 19/436* (2014.01)
*H04N 19/70* (2014.01)
*H04N 19/82* (2014.01)

(52) U.S. Cl.
CPC ......... *H04N 19/174* (2014.11); *H04N 19/188* (2014.11); *H04N 19/436* (2014.11); *H04N 19/70* (2014.11); *H04N 19/82* (2014.11)

(58) Field of Classification Search
USPC .................................................. 375/240.24
See application file for complete search history.

(56) References Cited

OTHER PUBLICATIONS

International Preliminary Examination Report on Patentability (I) with an English translation mailed Mar. 15, 2022, 12 pages.

Bross, et al., "Versatile Video Coding (Draft 6)", Joint Video Experts (JVET) of ITU-T SG 16 WP 3, and ISO/IEC JTC 1/SC 29/WG 11, 15th Meeting: Gothenburg, SE, Jul. 3-12, 2019, JVET-O2001-vE, 32 pages.

Zhou, et al., AHG4: Sub-stream entry points SEI message, oint Video Experts (JVET) of ITU-T SG 16 WP 3, and ISO/IEC JTC 1/SC 29/WG 11, 11th Meeting: Shanghai, China, Oct. 10-19, 2012, JCTVC-K0200M26527, 9 pages.

* cited by examiner

FIG. 2A

| |
|---|
| T0(B0) |
| T1(B1) |
| T2(B2) |
| T3(B3) |
| T4(B4) |
| T5(B5) |
| T6(B6) |
| T7(B7) |

FIG. 2B

| |
|---|
| T0(B0) |
| T1(B1) |
| T2(B2) |
| T3(B3) |
| T4(B4) |
| T5(B5) |
| T6(B6) |
| T7(B7) |

FIG. 3

| |
|---|
| pic_parameter_set_rbsp( ) { |
| ... |
| single_tile_in_pic_flag |
| if( !single_tile_in_pic_flag ) { |
|   uniform_tile_spacing_flag |
|   if( uniform_tile_spacing_flag ) { |
|     tile_cols_width_minus1 |
|     tile_rows_height_minus1 |
|   } else { |
|     num_tile_columns_minus1 |
|     num_tile_rows_minus1 |
|     for( i = 0; i < num_tile_columns_minus1; i++ ) |
|       tile_column_width_minus1[ i ] |
|     for( i = 0; i < num_tile_rows_minus1; i++ ) |
|       tile_row_height_minus1[ i ] |
|   } |
| brick_splitting_present_flag |
| if( uniform_tile_spacing_flag  &&  brick_splitting_present_flag ) |
|   num_tiles_in_pic_minus1 |
| for( i = 0; brick_splitting_present_flag  && i <= num_tiles_in_pic_minus1; i++ ) { |
|   if( RowHeight[ i ] > 1 ) |
|     brick_split_flag[ i ] |
|   if( brick_split_flag[ i ] ) { |
|     if( RowHeight[ i ] > 2 ) |
|       uniform_brick_spacing_flag[ i ] |
|     if( uniform_brick_spacing_flag[ i ] ) |
|       brick_height_minus1[ i ] |
|     else { |
|       num_brick_rows_minus2[ i ] |
|       for( j = 0; j  <=  num_brick_rows_minus2[ i ]; j++ ) |
|         brick_row_height_minus1[ i ][ j ] |
|     } |
| ... |

INFORMATION INDICATING ALLOCATION OF CTUs TO TILE

INFORMATION INDICATING ALLOCATION OF CTU ROWS TO BRICK

FIG. 4A

|   |   |   |
|---|---|---|
| 0 | 1 | 3 |
|   | 2 |   |
| 4 | 5 | 6 |
|   |   | 7 |

FIG. 4B

|   |   |
|---|---|
| 0 | 2 |
| 1 | 3 |
|   | 4 |

FIG. 5

```
pic_parameter_set_rbsp( ) {
    ...
    single_tile_in_pic_flag
    if( !single_tile_in_pic_flag ) {
        ...
        single_brick_per_slice_flag
        if( !single_brick_per_slice_flag )
            rect_slice_flag
        if( rect_slice_flag  &&  !single_brick_per_slice_flag ) {
            num_slices_in_pic_minus1
            bottom_right_brick_idx_length_minus1
            for( i = 0; i < num_slices_in_pic_minus1; i++ ) {
                bottom_right_brick_idx_delta[ i ]
                brick_idx_delta_sign_flag[ i ]
            }
        }
        loop_filter_across_bricks_enabled_flag
        if( loop_filter_across_bricks_enabled_flag )
            loop_filter_across_slices_enabled_flag
    }
    if( rect_slice_flag ) {
        signalled_slice_id_flag
        if( signalled_slice_id_flag ) {
            signalled_slice_id_length_minus1
            for( i = 0; i <= num_slices_in_pic_minus1; i++ )
                slice_id[ i ]
        }
    }
    entropy_coding_sync_enabled_flag
    if( !single_tile_in_pic_flag || entropy_coding_sync_enabled_flag )
        entry_point_offsets_present_flag
    cabac_init_present_flag
}
```

INFORMATION INDICATING RELATIONSHIP BETWEEN SLICE AND BRICKS

FIG. 6

```
slice_header( ) {
    slice_pic_parameter_set_id
    if( rect_slice_flag    NumBricksInPic > 1 )
        slice_address
    if( !rect_slice_flag   &&   !single_brick_per_slice_flag )
        num_bricks_in_slice_minus1
    slice_type
    ...
    if( entry_point_offsets_present_flag   &&   NumEntryPoints > 0 ) {
        offset_len_minus1
        for( i = 0; i < NumEntryPoints; i++ )
            entry_point_offset_minus1[ i ]
    }
    if( slice_header_extension_present_flag ) {
        slice_header_extension_length
        for( i = 0; i < slice_header_extension_length; i++ )
            slice_header_extension_data_byte[ i ]
    }
    byte_alignment( )
}
```

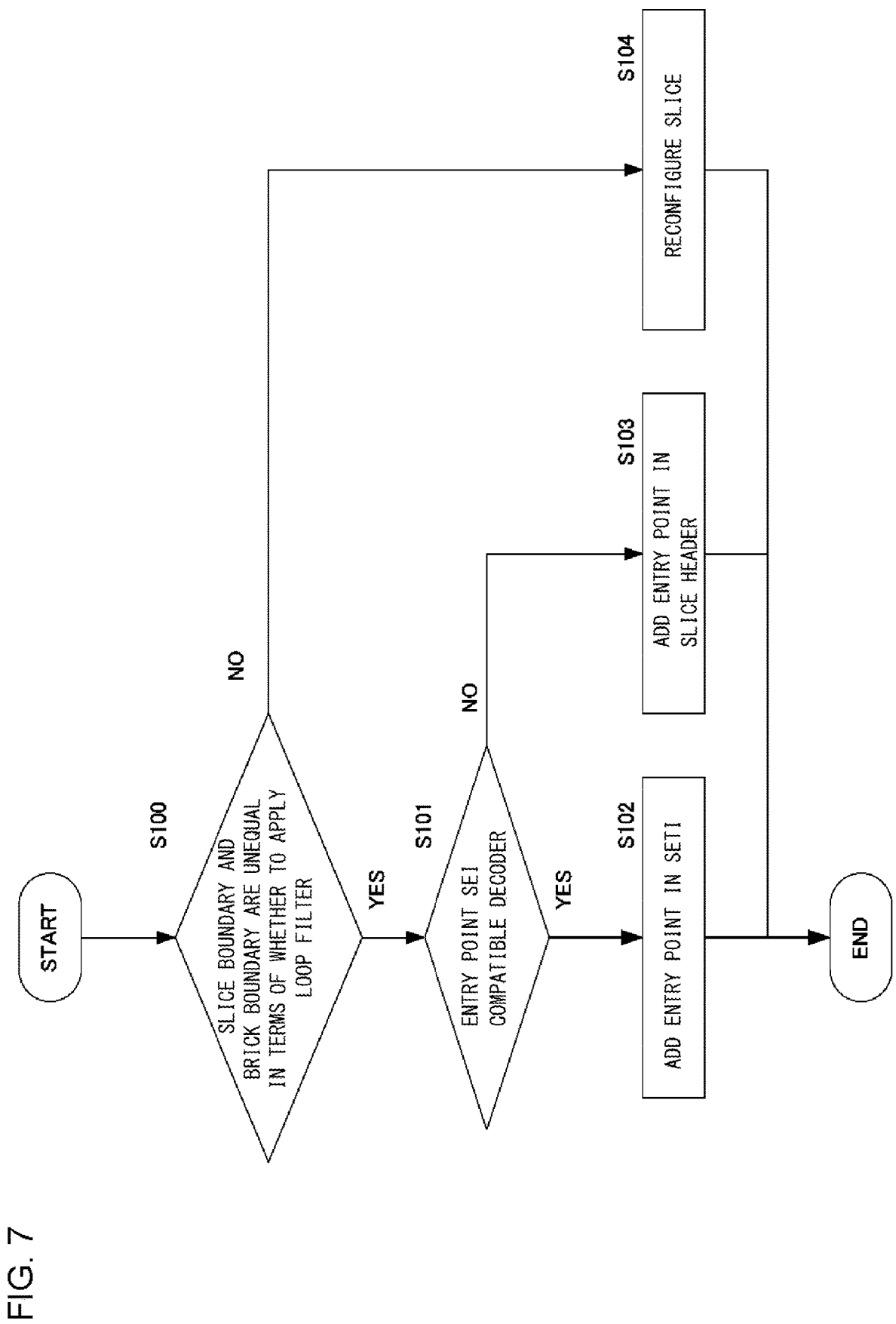

FIG. 8

```
sei_message( ) {
    payloadType = 0
    do {
        payload_type_byte
        payloadType += payload_type_byte
    } while (payload_type_byte == 0xFF )
    payloadSize = 0
    do {
        payload_size_byte
        payloadSize += payload_size_byte
    } while (payload_size_byte == 0xFF )
    sei_payload( payloadType, payloadSize )
}
```

FIG. 9

```
sei_payload( payloadType, payloadSize ) {
    if( nal_unit_type == PREFIX_SEI_NUT )
        if( payloadType == 0 )
            buffering_period( payloadSize )
        else if( payloadType == 1 )
            pic_timing( payloadSize )
        ...
    else /* nal_unit_type == SUFFIX_SEI_NUT */
        if( payloadType == 128 )
            entry_point ( payloadSize )
        ...
    ...
}
```

FIG. 10

```
entry_ponit( payloadSize ) {
{
  for( s = 0; s < NumSlicesInPic; s++ ) {
    offset_len_minus1[s]
    for( i = 0; i < NumEntryPoints[s]; i++ )
      entry_point_offset_minus1[ i ]
  }
}
```

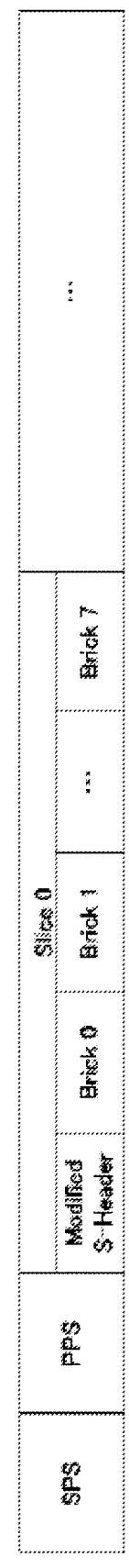
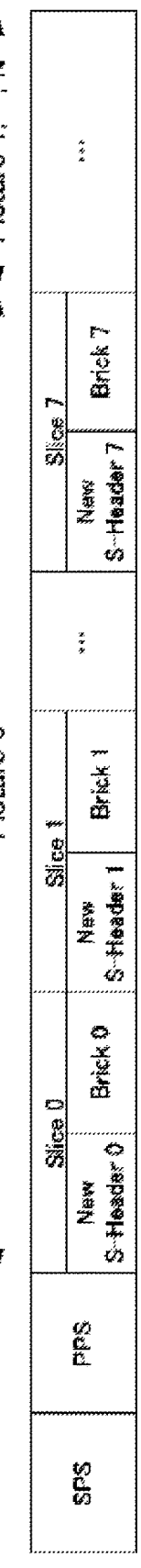
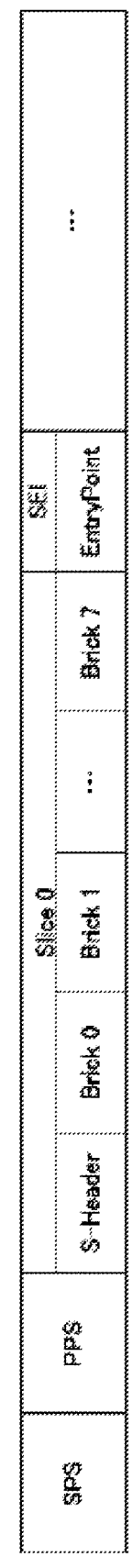
FIG. 11A
FIG. 11B
FIG. 11C
FIG. 11D

FIG. 12

| |
|---|
| pic_parameter_set_rbsp( ) { |
| ... |
| single_tile_in_pic_flag |
| if( !single_tile_in_pic_flag ) { |
| ... |
| single_brick_per_slice_flag |
| if( !single_brick_per_slice_flag ) |
| rect_slice_flag |
| if( rect_slice_flag  &&  !single_brick_per_slice_flag ) { |
| num_slices_in_pic_minus1 |
| bottom_right_brick_idx_length_minus1 |
| for( i = 0; i < num_slices_in_pic_minus1; i++ ) { |
| bottom_right_brick_idx_delta[ i ] |
| brick_idx_delta_sign_flag[ i ] |
| } |
| } |
| loop_filter_across_bricks_enabled_flag |
| if( loop_filter_across_bricks_enabled_flag ) |
| loop_filter_across_slices_enabled_flag |
| } |
| if( rect_slice_flag ) { |
| signalled_slice_id_flag |
| if( signalled_slice_id_flag ) { |
| signalled_slice_id_length_minus1 |
| for( i = 0; i  <=  num_slices_in_pic_minus1; i++ ) |
| slice_id[ i ] |
| } |
| } |
| entropy_coding_sync_enabled_flag |
| if( !single_brick_per_slice_flag  ||  entropy_coding_sync_enabled_flag ) |
| entry_point_offsets_present_flag |
| cabac_init_present_flag |
| |

IMAGE CONVERSION APPARATUS AND IMAGE DECODING APPARATUS

BACKGROUND OF THE INVENTION

1. Field of the Invention

The present invention relates to an image coding and decoding technique capable of parallel processing.

2. Description of the Related Art

In HEVC, tiles and entropy sync coding are defined as tools for parallel processing. In versatile video coding (VVC), a next-generation video coding standard being formulated in joint video expert team (JVET), improvements in parallel processing tools are being studied.

[Non-patent literature 1] Versatile Video Coding (Draft 6)

The technique of non-patent literature 1 is being formulated into a standard, and there is a problem with processing efficiency of parallel processing tools.

SUMMARY OF THE INVENTION

The image conversion apparatus according to an embodiment of the present invention is an image conversion apparatus adapted to convert a coded picture that includes a slice including an integer number of rectangular areas each including a collection of one or more rows of blocks, the blocks being derived from dividing an image into blocks of a predetermined size, wherein the image conversion apparatus converts the coded picture so as to reconfigure a relationship between the slice and the rectangular areas included in the coded picture, when a slice boundary and a rectangular area boundary in the coded picture are equal in terms of whether to apply a loop filter and converts the coded picture so as not to change the relationship between the slice and the rectangular areas included in the coded picture when the slice boundary and the rectangular area boundary in the coded picture are not equal in terms of whether to apply a loop filter.

Another embodiment of the present invention relates to an image decoding apparatus. The apparatus is an image decoding apparatus adapted to decode a bitstream for a slice including an integer number of rectangular areas each including a collection of one or more rows of blocks, the blocks being derived from dividing an image into blocks of a predetermined size, wherein the bitstream for the slice is included in an NAL unit, and the image decoding apparatus decodes an entry point indicating a starting byte position of the second and subsequent rectangular areas included in the slice, from a further NAL unit different from the NAL unit including the slice.

Still another embodiment of the present invention also relates to an image decoding apparatus. The apparatus is an image decoding apparatus adapted to decode a bitstream for a slice including an integer number of rectangular areas each including a collection of one or more rows of blocks, the blocks being derived from dividing an image into blocks of a predetermined size, wherein, when a flag indicating a possibility that the slice includes two or more rectangular areas indicates a possibility that the slice includes two or more rectangular areas, the image decoding apparatus decodes a flag that indicates whether to include an entry point indicating a starting byte position of the second and subsequent rectangular areas included in the slice, from a picture parameter set for setting a parameter of a picture.

According to the present invention, parallel processing tools can be realized with a high efficiency.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 2A and 2B show examples in which a picture in a bitstream is divided into bricks;

FIG. 3 illustrates a syntax of PPS related to information indicating allocation of CTUs to a tile and information indicating allocation of CTU rows to a brick;

FIGS. 4A and 4B illustrate examples of brick index;

FIG. 5 illustrates a syntax of a part of PPS;

FIG. 6 illustrates a syntax of a part of a slice header;

FIG. 7 is a flowchart showing the operation of the conversion unit;

FIG. 8 shows a syntax of an SEI message;

FIG. 9 shows a syntax of an SEI payload;

FIG. 10 illustrates a syntax of an entry point SEI message;

FIGS. 11A-11D illustrate a bitstream output by the conversion unit;

FIG. 12 illustrates a syntax of a part of PPS according to the variation of the first embodiment;

DETAILED DESCRIPTION OF THE INVENTION

Figure 1:
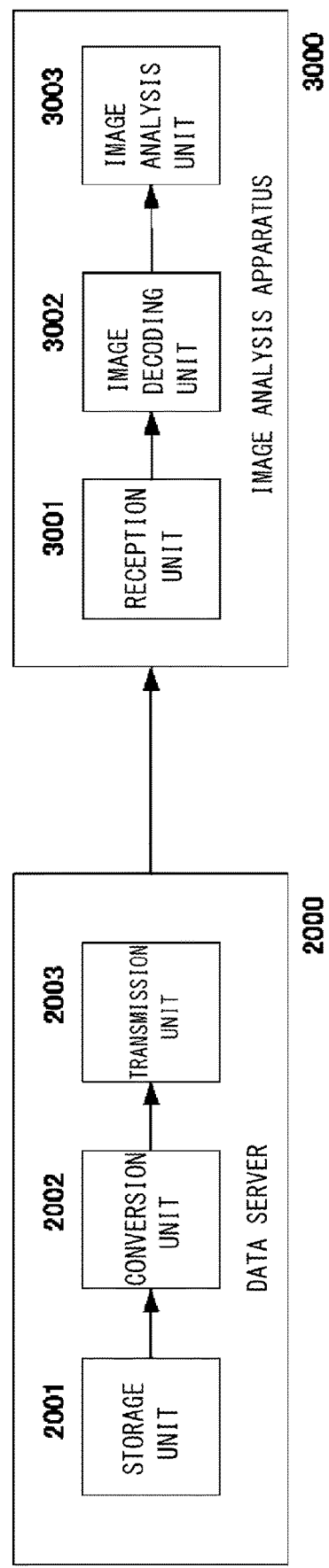
FIG. 1 illustrates a configuration of the first embodiment.

The invention will now be described by reference to the preferred embodiments. This does not intend to limit the scope of the present invention, but to exemplify the invention.

It will be understood that the embodiments of the present invention are based on the technique studied in versatile video coding (VVC), a next-generation video coding standard being formulated in joint video expert team (JVET). In VVC, as in AVC and HEVC in the related art, techniques such as block division, intra prediction, inter prediction, transform, quantization, entropy coding, loop filter, etc. are used.

The techniques and technical terms used in the embodiments of the present invention will be defined below. Hereinafter, images and pictures are used to mean the same thing unless otherwise specified. In the embodiments of the present invention, the image coding unit performs coding, and the image decoding unit performs decoding.

<Coding Tree Unit and Coding Block>

A picture is divided uniformly into blocks of a predetermined size. The block of a predetermined size is defined as a coding tree block (CTB). Recursive division is possible inside each coding tree block. A block subject to coding or decoding resulting from division into coding tree blocks is defined as a coding block (CU). Intra prediction and inter prediction is coded (decoded) in units of coding blocks. Further, the coding tree block and the coding block are generically defined as blocks. Proper block division enables efficient coding (decoding). The size of a coding tree block may have a fixed value predefined between the encoder and the decoder. Alternatively, the size of a coding tree block determined by the encoder may be transferred to the decoder.

Further, a set of one luma coding tree block and two chroma coding tree blocks in a picture are defined as a coding tree unit (CTU) as a unit of coding. One luma coding tree block may be defined as one CTU, or coding tree blocks on three color planes may be defined as one CTU. The size of a CTU (CTB) is coded (decoded) by a sequence parameter set (SPS).

<Tile and Brick>

A tile is a rectangular area formed by a plurality of CTUs in a picture. A brick is a rectangular area formed by one or more CTU rows in a tile. A CTU does not belong to a plurality of tiles and belongs to only one tile. A CTU does not belong to a plurality of bricks and belongs to only one brick. A brick does not belong to a plurality of tiles and belongs to only one tile. Allocation of CTUs to a tile and allocation of CTU rows to a brick are set in units of pictures. Information indicating allocation of CTUs to a tile and information indicating allocation of CTU rows to a tile are coded (decoded) by picture parameter set (PPS). As described above, a picture is divided into a plurality of tiles that do not overlap. Also, a tile is divided into a plurality of bricks that do not overlap. Hereafter, a rectangular area formed by a plurality of CTUs in a picture is expressed a brick. The requirement for a rectangular areas is that a rectangular area is formed by one or more CTU rows in a tile, a CTU does not belong to a plurality of tiles and belongs to only one tile, and a CTU does not belong to a plurality of rectangular areas and belongs to only one rectangular area.

So long as a slice header and parameter information of SPS, which sets a parameter of a bitstream, and of PPS, which sets a parameter of a coded picture, are available, it is possible to decode each coding brick in isolation. Therefore, a plurality of coding bricks can be coded (decoded) simultaneously and in parallel when SPS, PPS, and a slice header are available. A coded brick will be defined as a bitstream for a brick generated by coding a brick. Hereinafter, a coded picture is defined as a bitstream for a picture generated by coding a picture, and a coded slice is defined as a bitstream for a slice generated by coding a slice.

FIG. 3 illustrates a syntax of PPS related to information indicating allocation of CTUs to a tile and information indicating allocation of CTU rows to a brick. brick_splitting_present_flag is a flag indicating whether a tile is divided into two or more bricks. When brick_splitting_present_flag is 1, one or more tiles are divided into two or more bricks. When brick_splitting_present_flag is 0, none of the tiles is divided into two or more bricks. When brick_splitting_present_flag is 1, information on division into bricks is coded (decoded) for each tile.

Figures 4A, 4B:
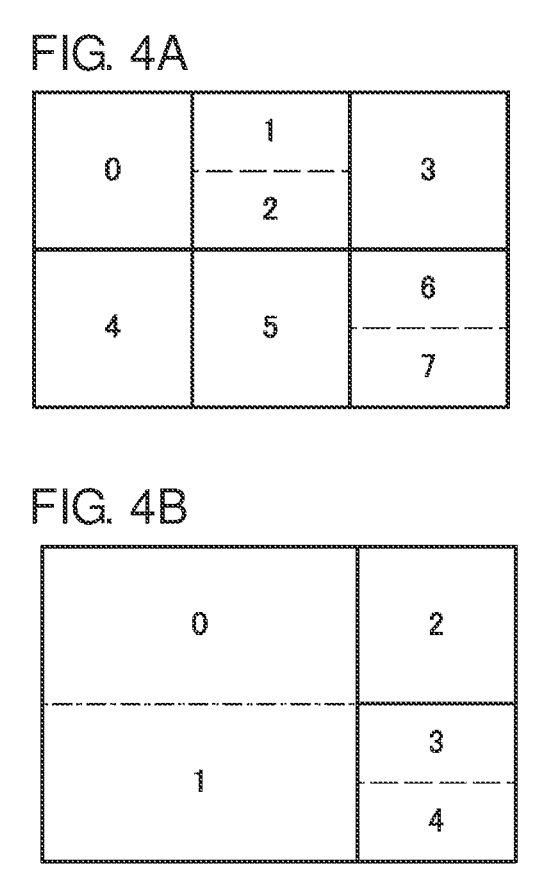

When a tile is not divided into bricks, one tile is dealt with as one brick. A tile index is an index allocated to tiles in a picture in the raster scan sequence. A brick index is an index allocated to bricks in a picture. When a picture is divided into a plurality of tiles, a brick index is an index allocated, in the raster scan sequence, to each of the bricks in each of the tiles in a picture in the tile index sequence. A brick index is an integer equal to or larger than 0 and less than the number of bricks (NumBricksInPic) in a picture. The raster scan sequence is a sequence of scanning in the horizontal direction first, then making a vertical movement, and scanning in the horizontal direction. FIGS. 4A and 4B illustrate examples of brick index. FIG. 4A shows an example in which the number of bricks in a picture is eight, and FIG. 4B shows an example in which the number of bricks in a picture is five.

<Sequence of Processing CTUs>

CTUs are processed in the raster scan sequence in a brick, and bricks are processed in the raster scan sequence in a tile.

<Slice and Slice Mode>

A slice is a region including a collection of an integer number of bricks. The modes of collecting bricks into a slice include the rectangular slice mode and the raster scan slice mode. FIG. 5 illustrates a syntax of a part of PPS. The rectangular slice mode and the raster scan slice mode will be described with reference to FIG. 5. When a flag (single_brick_per_slice_flag) indicating a possibility that a slice includes two or more bricks indicates a possibility that a slice includes two or more bricks (single_brick_per_slice_flag is 0), rect_slice_flag is coded (decoded). When a slice includes only one brick (single_brick_per_slice_flag is 1), rect_slice_flag will be 0. When rect_slice_flag is 1, it means the rectangular slice mode. When rect_slice_flag is 0, it means the raster scan slice mode.

<Rectangular Slice Mode>

In the rectangular slice mode, bricks in a rectangular area are collected into a slice. In the rectangular slice mode, the sequence of processing bricks is not the raster scan sequence so that the correspondence between a slice and bricks is not uniquely defined. By coding (decoding) information indicating the correspondence between a slice and bricks in PPS, the correspondence between a slice and bricks can be acquired.

num_slices_in_pic_minus1, indicating a value derived from subtracting 1 from the number of slices in a picture, is coded (decoded) in PPS to enable acquiring the number of slices in a picture. bottom_right_brick_idx_delta and brick_idx_delta_sign_flag, indicating the bottom right brick index included in each slice in a picture, are coded (decoded) in PPS to enable deriving the correspondence between a slice and bricks in a picture.

As described above, flexibility can be given to the sequence of processing bricks in the rectangular slice mode, by coding (decoding) information indicating the correspondence between a slice and bricks in PPS. For example, as shown in FIG. 4B, by allocating a large screen to the tile to which brick 0 and brick 1 belong and allocating a small screen to the other bricks, the sequence of processing large screens can be prioritized.

<Raster Scan Slice Mode>

In the raster scan slice mode, bricks are collected to form a slice in the raster scan sequence. In the raster scan slice mode, therefore, it is not necessary to code (decode) the correspondence in position between bricks and slices in PPS. In the raster scan slice mode, information indicating the correspondence between a slice and bricks is not coded (decoded) in PPS so that flexibility can be given to the correspondence between a slice and bricks. The number of bricks included in a slice can be adjusted during encoding. Referring to FIG. 4B, for example, whether to form a slice only by brick 0 or by brick 0 and brick 1 can be adjusted. This enables adjusting the volume of code for the slice.

<Slice ID>

A slice ID is an ID for uniquely identifying a slice. In the case of raster scan slice mode, the slice ID of the ith slice [i] in the raster scan sequence is i. The slice ID is a value equal to or greater than 0 and equal to or less than num_slices_in_pic_minus1. In the case of the rectangular slice mode, the slice ID can be explicitly coded (decoded) as an arbitrary value in PPS. When the rectangular slice mode is in effect and when the slice ID is not explicitly coded (decoded) in PPS, the slice ID of the ith slice in the raster scan sequence is i, and the slice ID is a value equal to or greater than 0 and equal to or less than num_slices_in_pic_minus1.

<Boundary Control Flag of Loop Filter>

A boundary control flag for a loop filter will be described with reference to a syntax of FIG. 5. loop_filter_across_bricks_enabled_flag is a flag indicating whether to apply a loop filter to a brick boundary. When the flag is 1, a loop filter is applied. When the flag is 0, a loop filter is not applied. loop_filter_across_slices_enabled_flag is a flag indicating whether to apply a loop filter to a slice boundary. When the flag is 1, a loop filter is applied. When the flag is 0, a loop filter is not applied. When a brick boundary and a slice boundary overlap, a loop filter is applied when both flags are 1, and a loop filter is not applied when one or both of the flags is (are) 0.

<Slice Header>

A description will be given of a slice header. FIG. 6 illustrates a syntax of a part of a slice header. When the rectangular slice mode is in effect or when NumBricksInPic, indicating the number of bricks in a picture, is larger than 1, the slice address (slice_address) is coded (decoded). Further, when the raster scan slice mode is in effect and when single_brick_per_slice_flag is 0, num_bricks_in_slice_minus1, indicating the number of bricks included in the slice, is coded (decoded).

In the case of the raster scan slice mode, the slice address indicates the first brick ID included in the slice. The brick ID is an ID allocated to the CTUs included in each brick in a picture. The CTUs belonging to the same brick have the same brick ID. The brick ID is an integer value equal to or greater than 0 and less than the number of bricks in a picture (NumBricksInPic). In the case of the raster scan slice mode, the position of a brick in a picture is defined in PPS. By defining the slice address to be the first brick ID included in a slice, the position of start of a slice in a picture can be determined earliest. The bit length of slice_address is Ceil (Log 2(NumBricksInPic)), and slice_address is a value equal to or greater than 0 and equal to or less than (NumBricksInPic−1). In the case of the raster scan slice mode, information indicating the correspondence between a slice and bricks is not coded (decoded) in PPS so that the slice address is defined to be the first brick ID included in a slice. In the case of the raster scan slice mode, bricks are contiguously included in a slice in the raster scan sequence. When the first brick ID and the number of bricks included in the slice are known, therefore, the correspondence between a slice and bricks can be uniquely identified. Ceil(x) is a function that gives the minimum integer value equal to or greater than x.

In the case of the rectangular slice mode, information indicating the correspondence between a slice and bricks is coded (decoded) in PPS. Therefore, the brick ID can be derived from the slice ID, and the slice address is defined to indicate the slice ID. It is indicated here that the slice address is defined to indicate the slice ID in the case of the rectangular slice mode, but, as in the case of the raster scan slice mode, the slice address may be defined to be the first brick ID included in a slice. Defining the slice address to be the first brick ID included in a slice in the case of the rectangular slice mode as in the raster scan slice mode makes extra circuits and modules unnecessary and reduces the memory capacity and circuit scale of the encoder and the decoder. Further, when signalled slice id flag of PPS is 0, it is not necessary to manage the slice ID and the memory capacity of the encoder and the decoder can be further reduced.

<Entry Point>

A description will now be given of a starting byte position of a coded brick in slice data with reference to FIG. 6. As shown in FIG. 6, the starting byte position of a coded brick in slice data is coded (decoded) in a slice header as an entry point (entry_point_offset_minus1[i]). It is therefore possible for the decoder to acquire the starting byte position of a coded brick by decoding the slice header. NumEntryPoints is a value derived from subtracting 1 from the number of bricks in a slice. The starting byte position of the first coding brick in the slice data is 0 obviously and so is not coded (decoded). The starting byte position of the second and subsequent coded bricks in the slice data is coded (decoded). entry_point_offset_present_flag is a flag defining whether an entry point is coded (decoded) in the slice header. When entry_point_offset_present_flag is 1, the entry point is coded (decoded). When entry_point_offset_present_flag is 0, the entry point is not coded (decoded). offset_len_minus1 is value indicating the bit length of entry_point_offset_minus1. As shown in FIG. 5, entry_point_offset_present_flag is coded (decoded) in PPS when single_tile_in_pic_flag is 0 or entropy_coding_sync_enabled_flag is 1. single_tile_in_pic_flag is a flag indicating whether a picture is comprised of one tile. When single_tile_in_pic_fla is 1, the picture is comprised of one tile. When single_tile_in_pic_fla is 0, the picture is comprised of a plurality of tiles. When a picture is comprised of one tile, it is not permitted to form a tile by a plurality of bricks, and one tile is formed by one brick. entropy_coding_sync_enabled_flag is a flag indicating whether parallel processing of CTU columns in a brick is permitted. When entropy_coding_sync_enabled_flag is 1, parallel processing of CTU columns in a brick is permitted. When entropy_coding_sync_enabled_flag is 0, parallel processing in a brick is not permitted.

<SEI>

Supplemental enhancement information (SEI) is information unnecessary for a process to generate a pixel in a decoded image but is information necessary for the operation of the decoder. For example, SDI includes buffering period SEI, which is information for operating a hypothetical reference decoder (HRD) to properly, and picture timing SEI, which defines a point of time of output of a decoded image. SEI is coded (decoded) as an SEI message.

<NAL Unit>

A NAL unit is comprised of a header and a payload. The payload type is encoded (decoded) in the header, and a bitstream of a type indicated by the payload type is included in the payload. The payload type may be SPS, PPS, coded slice, SEI message, etc. When the payload type is a type indicates that a slice is included, for example, a bitstream for a slice is stored in the payload. When the payload type indicates that an SEI message is included, a bitstream for an SEI message is stored in the payload.

<Bitstream>

In VVC and HEVC, an SPS, a PPS, a coded slice, an SEI message, etc. are stored in a NAL unit to form a bitstream. A coded slice is comprised of a slice header and slice data. A coding tree block is coded in the slice data. A bitstream includes one or more coded pictures.

<HRD>

A HRD is a hypothetical reference decoder for examining whether a bitstream complies with the coding standard. A coded picture buffer (CPB) for decoding a bitstream and a decoded picture buffer (DPB) for outputting a decoded picture are defined in a HRD. The HRD examines whether the CPB or the DPB does not crush when the bitstream is decoded based on the point of time of input and output in the CPB and the DPB coded in the bitstream. When the CPB and the DPB do not crush, the bitstream complies with the coding standard. In type 1 of HRD, the coded slice of the bitstream is examined for compliance with the standard. In type 1 of HRD, NALs that include an SPS, a PPS, or an SEI message are not examined. The point of time of input and output in the CPB and the DPB is coded (decoded) in an SEI message.

First Embodiment

Configuration of First Embodiment

A description will be given of the first embodiment of the present invention. First, a configuration of the embodiment will be described. FIG. 1 illustrates a configuration of the first embodiment. This embodiment is comprised of a data server 2000 and an image analysis apparatus 3000. The data server 2000 is comprised of a storage unit 2001, a conversion unit 2002, and a transmission unit 2003. The data server 2000 has a function of converting a bitstream and so is referred to as an image conversion apparatus. The image analysis apparatus 3000 is comprised of a reception unit 3001, an image decoding unit 3002, and an image analysis unit 3003.

The storage unit 2001 stores a bitstream. The image decoding unit 3002 can decode the bitstream stored in the storage unit 2001. It is assumed that the maximum number of bricks that the image decoding unit 3002 can process in parallel (hereinafter, maximum brick parallel processing count) is eight.

Operation of the First Embodiment

A description will be given of the operation according to the embodiment. The operation of the constituting elements will be described based on FIG. 1. First, the operation of the data server 2000 and the image analysis apparatus 3000 will be described.

The data server 2000 reads the bitstream and the property parameter of the image decoding unit 3002 from the storage unit 2001 based on a request from the image analysis apparatus 3000 and inputs the bitstream and the parameter to the conversion unit 2002. The property parameter represents information indicating whether the image decoding unit 3002 is compatible with entry point SEI. It will be assumed that the property parameter is maintained in the storage unit 2001 in advance. The conversion unit 2002 converts the input bitstream and inputs the converted bitstream to the transmission unit 2003. The detailed description of the conversion unit 2002 will be described later. The transmission unit 2003 transmits the input bitstream to the image analysis apparatus 3000.

The reception unit 3001 inputs the bitstream input from the transmission unit 2003 to the image decoding unit 3002. The image decoding unit 3002 decodes the input bitstream in parallel according to the maximum brick parallel processing count to output a decoded image and inputs the decoded image to the image analysis unit 3003. Even if a frame rate for outputting a decoded image is set in the input bitstream, the image decoding unit 3002 outputs the decoded image without being bounded by the frame rate. The image analysis unit 3003 analyzes the input decoded image and outputs an analysis result. For example, the image analysis unit 3003 measures the image quality of the input decoded image or recognize a face, a person, etc. in the input decoded image.

When the image analysis unit 3003 analyzes a decoded image as described above, the analysis result output from the image analysis unit 3003 can be acquired in a short period of time by outputting the decoded image from the image decoding unit 3002 without being bounded by the frame rate of the bitstream.

<Bitstream>

A description will be given of a bitstream stored in the storage unit 2001. FIGS. 2A and 2B show examples in which a picture in a bitstream is divided into bricks. For simplicity of description, it will be assumed here that a picture is divided into tiles, and the tile is not divided into bricks. In other words, one tile represents one brick. FIG. 2A shows an example in which the screen is divided at every CTU row into eight bricks (tiles) from B0(T0) to B7(T7). FIG. 2B shows an example in which the screen is divided at every CTU column into eight bricks (tiles) from B0(T0) to B7(T7). 0 through 7 are allocated as brick IDs to brick B0 through brick B7. The number of bricks in a picture, NumBricksIn-Pic, is eight.

It is assumed that one picture is comprised of one slice. Therefore, slice 0 includes eight bricks from B0 to B7. Therefore, single_brick_per_slice_flag in PPS is 0. The bitstream may be either in the raster scan slice mode or the rectangular slice mode. entry_point_offset_present_flag, indicating whether to code an entry point in the slice header, is set to 0.

The advantage of setting entry_point_offset_present_flag to 0 will be described. When entry_point_offset_present_flag is set to 1, it is necessary to code an entry point, obtained as result of coding bricks, in the slice header. Even if a bitstream is generated by coding bricks in a slice in parallel, the bitstream cannot be transmitted until the number of bytes indicating the size of the brick is determined. It will therefore be necessary to transmit a stream in units of slices, and efforts for low latency can be made only in units of slices. When entry_point_offset_present_flag is set to 0, on the other hand, it is not necessary to code an entry point of the brick in the slice header. A bitstream can be transmitted in units of bricks, and efforts for low latency can be made in units of bricks.

<Detailed Operation of Conversion Unit>

A description will now be given of the detailed operation of the conversion unit 2002. FIG. 7 is a flowchart showing the operation of the conversion unit. The flow of FIG. 7 is executed for all coded pictures included in a bitstream.

An examination is made to see whether a slice boundary and a brick boundary are unequal in terms of whether to apply a loop filter (S100). More specifically, an examination is made to see whether the values of loop_filter_across_bricks_enabled_flag and loop_filter_across_slices_enabled_flag are unequal. When a slice boundary and a brick boundary are unequal in terms of whether to apply a loop filter (YES in S100), an examination is made to see whether the decoder is compatible with entry point SEI (S101). When a slice boundary and a brick boundary are equal in terms of whether to apply a loop filter (NO in S100), the slice is reconfigured.

When the decoder is compatible with entry point SEI (YES in S101), an entry point is added to the entry point SEI (S102). The detailed operation of adding an entry point to the entry point SEI will be described later. When the decoder is not compatible with entry point SEI (NO in S101), an entry point is added to the slice header (S103).

It should be noted here that, when a slice boundary and a brick boundary are unequal in terms of whether to apply a loop filter, a change in a brick included in each slice results in a change in the decoded image and so requires re-coding. When a slice boundary and a brick boundary are unequal in terms of whether to apply a loop filter, therefore, the bitstream is converted so as not to change the configuration of the bricks included in each slice.

When a slice boundary and a brick boundary are equal in terms of whether to apply a loop filter, on the other hand, a change in a brick included in each slice does not result in a change in the decoded image and so does not require re-coding. When a slice boundary and a brick boundary are equal in terms of whether to apply a loop filter, therefore, the bitstream is converted to change the configuration of the bricks and the slice.

In this case, a step of examining whether the values of loop_filter_across_bricks_enabled_flag and loop_filter_across_slices_enabled_flag are unequal (S100) is provided in consideration of a decoder suitable for parallel processing of slices. When an ordinary decoder is targeted, it is proper to start from the process of examining whether the decoder is compatible with entry point SEI (S101) without executing the process of examining whether the values of loop_filter_across_bricks_enabled_flag and loop_filter_across_slices_enabled_flag are unequal (S100).

<Addition of Entry Point to Slice Header>

A description will be given of the operation of adding an entry point to the slice header. To add an entry point to the slice header, information on entry points of brick B1 through brick B7 is coded (decoded) in the bitstream in accordance with the syntax of FIG. 6.

<Reconfiguration of Slice>

A description will now be given of the operation of reconfiguring a slice header. In a bitstream stored in the storage unit 2001, one slice includes eight bricks. The slice is reconfigured such that one slice includes one brick. single_brick_per_slice_flag of PPS is set to 1.

<Addition of Entry Point to Entry Point SEI>

A description will now be given of the detailed operation of adding an entry point to entry point SEI. To add an entry to entry point SEI, information on entry points of brick B1 through brick B7 is coded (decoded) in accordance with the syntax of FIG. 8, FIG. 9, and FIG. 10.

FIG. 8 shows a syntax of an SEI message. The payload type (payloadType) is derived from payload_type_byte. When the payload type is 128, an entry point SEI message is coded (decoded) in an SEI payload (sei_payload). Entry point SEI message is synonymous with entry point SEI.

FIG. 9 shows a syntax of an SEI payload. SEI messages such as buffering period SEI message, picture timing, and picture timing SEI message, as well as the entry point SEI message, are coded (decoded) in the SEI payload. There are two types of NAL units for storing SEI messages, namely, PREFIX_SEI_NUT that is coded (decoded) coded before a coded slice and SUFFIX_SEI_NUT that is coded (decoded) after a coded slice.

FIG. 10 illustrates a syntax of an entry point SEI message. The syntax of an entry point SEI message will be described with reference to FIG. 10. NumSlicesInPic indicates the number of slices in a picture. In the case of the rectangular slice mode, NumSlicesInPic can be acquired in a PPS. In the case of the raster scan slice mode, NumSlicesInPic can be acquired by counting the number of slices. offset_len_minus1[s] for the Sth slice and entry_point_offset_minus1 totaling the number indicated by NumEntryPoints are coded (decoded). The meanings of offset_len_minus1 and entry_point_offset_minus1 are as described above.

<Bitstream after Conversion>

FIGS. 11A-11D illustrate a bitstream output by the conversion unit 2002. FIG. 11A shows an example of an input bitstream. The bitstream is comprised of an SPS, a PPS, a coded slice forming a coded picture 0, a coded slice forming a coded picture 1, . . . , a coded slice forming a coded picture N in the stated order.

FIG. 11B shows an example of a bitstream in which an entry point is added to the slice header. A description will be given of FIG. 11B hereinafter. Each of the NAL units of SPS, PPS, and coded slice 0 is a bitstream. A coded slice 0 is comprised of a slice header to which an entry point is added (Modified S-Header of FIG. 11B) and slice data including eight coded bricks from brick 0 (Brick 0 of FIG. 11B) to coded brick 7 (Brick 7 of FIG. 11B). The slice header to which an entry point is added differs from the slice header of the input bitstream. To decode the coded brick 0 through the coded brick 7, the slice header to which an entry point is added is necessary.

FIG. 11C is an example of a bitstream in which a slice is reconfigured. A description will be given of FIG. 11C hereinafter. Each of the NAL units of SPS, PPS, and coded slice 0 through coded slice 7 is a bitstream. A coded slice i (i=0, 1, . . . 7) is comprised of a slice header i (New S-Header i of FIG. 11C) and slice data including a coded brick i (Brick i of FIG. 11C). The slice header i differs from the slice header of the input bitstream. To decode the coded brick i, the slice header i is necessary.

In this way, parallelization in units of coded slices is easily realized by converting the bitstream such that one coded slice includes one coded brick and setting single_brick_per_slice_flag of PPS to 1. In this case, an entry point is not necessary, and access may be made in units of NAL units.

In this case, the coded picture is converted such that one coded slice includes one brick. The manner of conversion is not limited to this so long as the bricks included in the slice are reconfigured in accordance with the maximum brick parallel processing count of the image decoding unit 3002. The coded picture may be converted such that one coded slice includes a plurality of bricks. When the maximum brick parallel processing count of the image decoding unit 3002 is four, for example, the coded picture is converted such that one coded slice includes two bricks.

FIG. 11D is an example of a bitstream in which an entry point is added to the entry point SEI. A description will be given of FIG. 11D hereinafter. Each of the NAL units of SPS, PPS, coded slice 0, and SEI is a bitstream. A coded slice 0 is comprised of a slice header (S-Header of FIG. 11D) and slice data including eight coded bricks from brick 0 (Brick 0 of FIG. 11D) to coded brick 7 (Brick 7 of FIG. 11D). In this case, the slice header is identical to the slice header of the input bitstream. To decode the coded brick i through the coded brick 7, the slice header is necessary.

The size of the post-conversion bitstream in which an entry point is added to the slice header is smallest in comparison with that of the other schemes. It is, however, necessary to re-code the slice header with bit precision, which changes the size of the coded slice.

The bitstream in which the coded slice is reconfigured is comprised of eight coded slices. Therefore, the size of the post-conversion bitstream is larger than that of the other schemes. Since the entry point is not necessary, however, the structure of the bitstream is simplified. Therefore, a decoder not compatible with parallelization in units of coded bricks but compatible with parallelization in units of coded slices can decode the bitstream.

A bitstream in which an entry point is added to the entry point SEI can be produced easily, simply by inserting the entry point SEI after the last coded slice in the coded picture and without changing the input bitstream. Coding (decoding) the entry point SEI after the coded slice in this way provides flexibility to the relationship between a slice and bricks in the raster scan slice mode and, at the same time, notifies the decoder of the entry point in the coded slice. Further, since the bitstream is not changed, the stream conformance of type 1 of HRD is not affected. It is therefore not necessary to convert a bitstream by inspecting the compatibility of HRD. It is possible to convert a bitstream properly and easily.

<Variation>

A variation to the first embodiment will be described. In this variation, the syntax of PPS differs from that of the embodiment. FIG. 12 illustrates the syntax of a part of PPS according to the variation of the first embodiment. The illustrated syntax differs from that of FIG. 5 of the first embodiment in respect of the condition to code (decode) entry_point_offset_present_flag. As shown in FIG. 12, when a flag indicating a possibility that a slice includes two or more bricks indicates a possibility that a slice includes two or more bricks (single_brick_per_slice_flag is 0) or when entropy_coding_sync_enabled_flag is 1, entry_point_offset_present_flag is coded (decoded) in PPS.

By coding (decoding) entry_point_offset_present_flag when single_brick_per_slice_flag is 0 as described above, it is not necessary to code entry_point_offset_present_flag when the slice includes only one brick even if the picture is comprised of a plurality of tiles (single_tile_in_pic_flag is 0). This eliminates a state in which entry_point_offset_present_flag is 1 when the slice includes only one brick so that the code volume can be reduced. By indicating inexplicitly that entry_point_offset_present_flag is 0 in the absence of entry_point_offset_present_flag, it is defined that an entry point is not provided when the slice includes only one brick. Further, when entry_point_offset_present_flag is 0 in the slice header, it is not necessary to inspect the number of bricks included in the slice so that the volume of the process can be reduced.

Second Embodiment

Configuration of Second Embodiment

Figure 13:
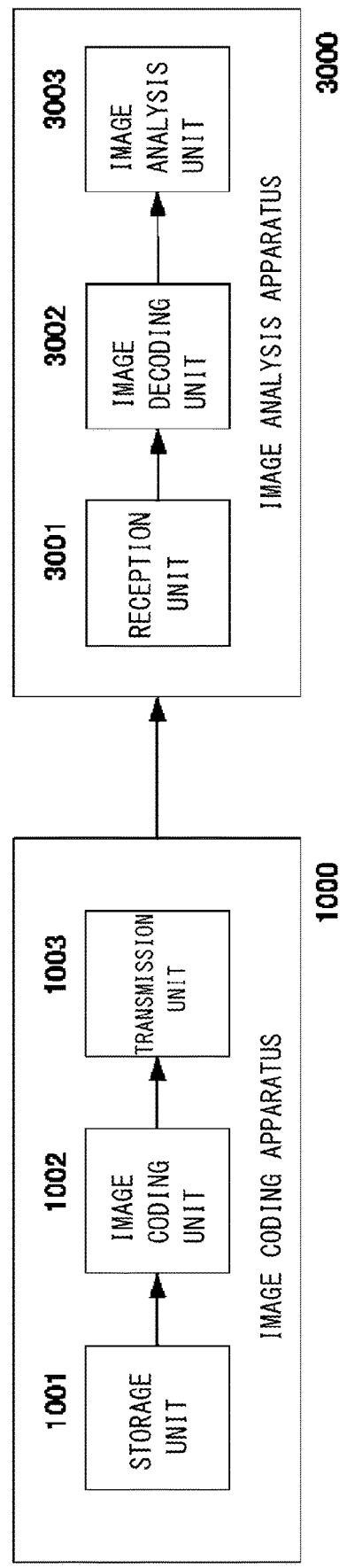
FIG. 13 illustrates a configuration of the second embodiment.

A description will now be given of the second embodiment of the present invention. FIG. 13 illustrates a configuration of the second embodiment. The second embodiment of the present invention differs from the first embodiment in that the data server 2000 is the image coding apparatus 1000. Hereinafter, only the differences from the first embodiment will be described.

The image decoding unit 3002 can decode the bitstream coded by the image coding unit 1002.

The image coding apparatus 1000 reads image data and a property parameter of image decoding unit 3002 from the storage unit 1001 based on a request from the image analysis apparatus 3000 and inputs the image data and the property parameter to the image coding unit 1002. The image coding unit 1002 codes the input image data and inputs the coded bitstream to the transmission unit 1003.

The image coding unit 1002 differs from the conversion unit 2002 in that the output bitstream is coded from the image data. The structure of the bitstream output by the image coding unit 1002 is the same as the bitstream output by the conversion unit 2002.

A description will be given below of the operation of the image coding unit 1002. The conversion unit 2002 acquires loop_filter_across_bricks_enabled_flag and loop_filter_across_slices_enabled_flag by decoding the bitstream. Meanwhile, the image coding unit 1002 determines loop_filter_across_bricks_enabled_flag and loop_filter_across_slices_enabled_flag.

When a slice boundary and a brick boundary are unequal in terms of whether to apply a loop filter, an inspection is made to see whether the image decoding unit 3002 is a decoder compatible with entry point SEI. When a slice boundary and a brick boundary are equal in terms of whether to apply a loop filter, the coded picture is coded such that one slice includes one brick.

When the image decoding unit 3002 is a decoder compatible with entry point SEI, the coded picture is coded by defining the entry point in the entry point SEI. When the image decoding unit 3002 is a not a decoder compatible with entry point SEI, the coded picture is coded by coding the entry point in the slice header.

As described above, the image coding apparatus 1000 can output a bitstream that is based on the request from of the image analysis apparatus 3000 and that can be decoded by the image decoding unit 3002 The advantage of the structure of the bitstream according to this embodiment is the same as that of the first embodiment.

In all of the embodiments described above, the bitstream output by the image coding apparatus has a particular data format so that it can be decoded in accordance with the coding scheme used in the embodiment. The bitstream may be recorded and provided in a computer-readable recording medium such as a HDD, SSD, flash memory, and optical disk. Alternatively, the bitstream may be provided from a server via a wires or wireless network. Therefore, the image decoding apparatus compatible with the image coding apparatus can decode the bitstream of this particular data format regardless of the means of provision.

When a wired or wireless network is used to exchange a bitstream between the image coding apparatus and the image decoding apparatus, the bitstream may be converted into a data format suited to the transmission mode of the communication channel and transferred accordingly. In that case, a transmission apparatus that converts the bitstream output by the image coding apparatus into coded data of a data format suited to the transmission mode of the communication channel and a reception apparatus that receives the coded data from the network, restores the bitstream, and supplies the bitstream to the image decoding apparatus are provided. The transmission apparatus includes a memory that buffers the bitstream output by the image coding apparatus, a packet processing unit that packetizes the bitstream, and a transmission unit that transmits the packetized coded data via the network. The reception apparatus includes a reception unit that receives the packetized coded data via the network, a memory that buffers the received coded data, and a packet processing unit that generates the bitstream by subjecting the coded data to a packetization process and provides the bitstream to the image decoding apparatus.

When a wired or wireless network is used to exchange a bitstream between the image coding apparatus and the image decoding apparatus, a relay apparatus that receives the bitstream transmitted by the transmission apparatus and supplies the bitstream to the reception apparatus may be provided in addition to the transmission apparatus and the reception apparatus. The relay apparatus includes a reception unit that receives the packetized coded data transmitted by the transmission apparatus, a memory that buffers the received coded data, and a transmission unit that transmits the packetized coded data to the network. The relay apparatus may further include a received packet processing unit that subjects the packetized coded data to a packetization process to generate a bitstream, a recording medium that stores the bitstream, and a transmitted packet processing unit that packetized the bitstream.

Alternatively, a display apparatus may be formed by adding a display unit that displays the image decoded by the image decoding apparatus to the configuration.

Still alternatively, an imaging apparatus may be formed by adding an imaging unit to the configuration and inputting the taken image to the image coding apparatus.

Figure 14:
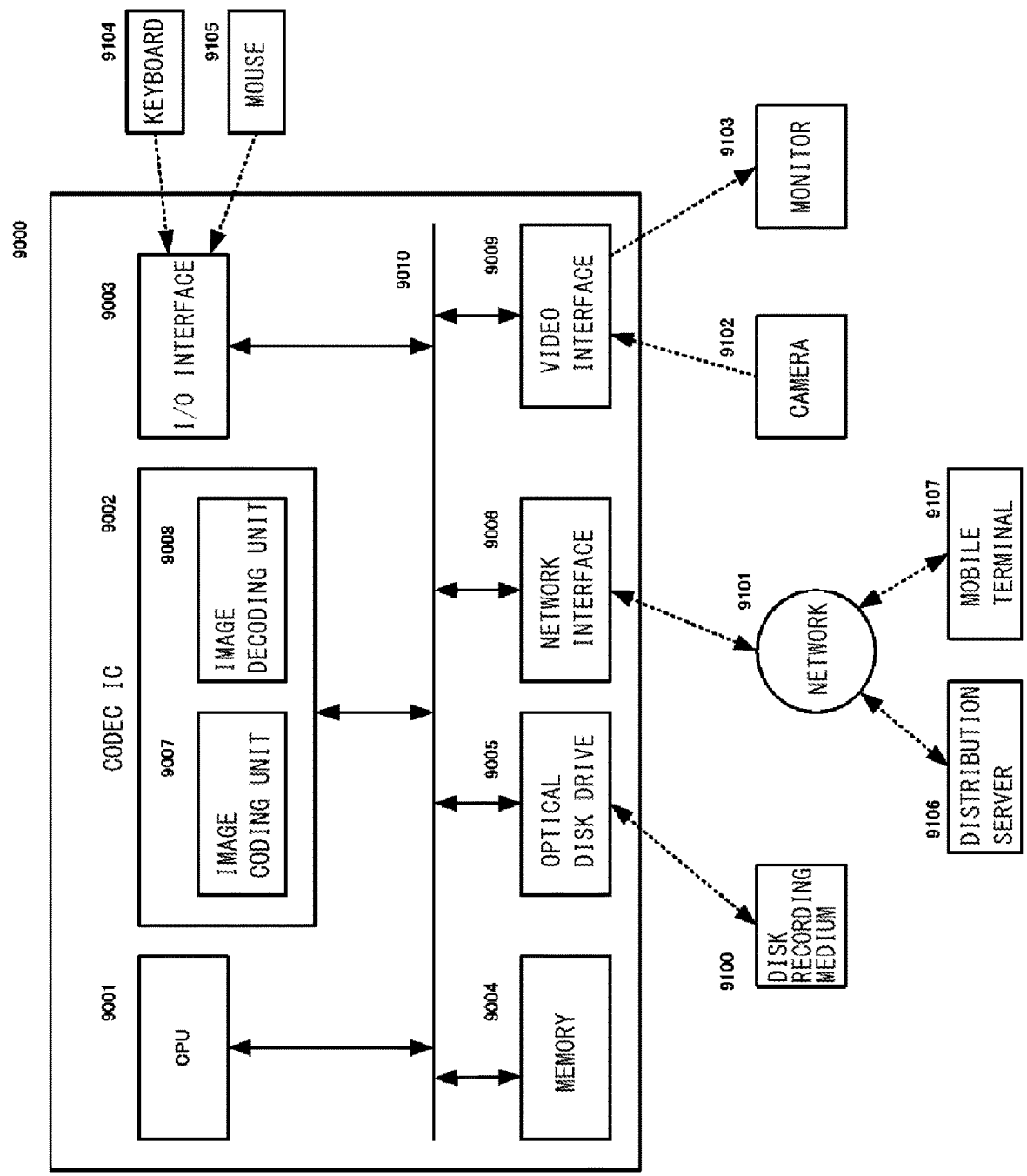
FIG. 14 shows an example of the hardware configuration of the coding and decoding apparatus of the first embodiment.

FIG. 14 shows an example of the hardware configuration of the coding and decoding apparatus of the present application. The coding and decoding apparatus includes the configurations of the image coding apparatus and the image decoding apparatus according to the embodiments of the present invention. A coding and decoding apparatus 900 of this configuration is provided with a CPU 9001, a codec IC 9002, an I/O interface 9003, a memory 9004, an optical disk drive 9005, a network interface 9006, and a video interface 9009. The parts are connected via a bus 9010.

The image coding unit 9007 and the image decoding unit 9008 are typically implemented as the codec IC 9002. The image coding process of the image coding apparatus according to the embodiments of the present invention is executed by the image coding unit 9007, and the image decoding process of the image decoding apparatus according to the embodiments of the present invention is executed by the image decoding unit 9008. The I/O interface 9003 is implemented by, for example, a USB interface and is connected to a keyboard 9104, a mouse 9105, etc. external to the apparatus. The CPU 9001 controls the coding and decoding apparatus 900 based on a user operation input via the I/O interface 9003 to perform the operation desired by the user. The user operation via the keyboard 9104, the mouse 9105, etc. may be selection of whether to execute a coding function or a decoding function, setting of a coding quality, source and destination of a bitstream, source and destination of an image.

When the user desires an operation of playing back the image recorded in a disk recording medium 9100, the optical disk drive 9005 reads the bitstream from the disk recording medium 9100 inserted and sends the bitstream thus read to the image decoding unit 9008 of the codec IC 9002 via the bus 9010. The image decoding unit 9008 subjects the input bitstream to the image decoding process in the image decoding apparatus according to the embodiment of the present invention and sends the decoded image to an external monitor 9103 via the video interface 9009. Further, the coding and decoding apparatus 9000 has a network interface 9006 and can connect to a distribution server 9106 or a mobile terminal 9107 external to the apparatus via the network 9101. When the user desires to play back the image recorded in the distribution server 9106 or the mobile terminal 9107 instead of the image recorded in the disk recording medium 9100, the network interface 9006 acquires the bitstream from the network 9101 instead of reading the bitstream from the input disk recording medium 9100. Further, when the user desires to play back the image recorded in the memory 9004, the bitstream recorded in the memory 9004 is subject to the image decoding process in the image decoding apparatus according to the embodiment of the present invention.

When the user desires an operation of coding the image taken by an external camera 9102 and recording the coded image in the memory 9004, the video interface 9009 receives the image from the camera 9102 and sends the image to the image coding unit 9007 of the codec IC 9002 via the bus 9010. The image coding unit 9007 subjects the image input via the video interface 9009 to the image coding process in the image coding apparatus according to the embodiment of the present invention to generate a bitstream. The image coding unit 9007 sends the bitstream to the memory 9004 via the bus 9010. When the user desires to record the bitstream in the disk recording medium 9100 instead of the memory 9004, the optical disk drive 9005 writes the bitstream in the disk recording medium 9100 inserted.

A hardware configuration provided with an image coding apparatus and not provided with an image decoding apparatus or a hardware configuration provided with an image decoding apparatus and not provided with an image coding apparatus is also possible. Such a hardware configuration can be realized by the codec IC 9002 being replaced by the image coding unit 9007 or the image decoding unit 9008.

The above-described processes related to coding and decoding can of course be implemented by hardware-based apparatus for transmission, storage, or reception. Alternatively, the processes can be implemented by firmware stored in a read-only memory (ROM), a flash memory, etc., or by software on a computer, etc. The firmware program or the software program may be made available by being recorded in, for example, a computer readable recording medium. Alternatively, the programs may be made available from a server via a wired or wireless network. Still alternatively, the programs may be made available in the form of data transmission over terrestrial or satellite digital broadcast systems.

Given above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An image conversion apparatus adapted to convert a coded picture that includes a slice including an integer number of rectangular areas each including a collection of one or more rows of blocks, the blocks being derived from dividing an image into blocks of a predetermined size, wherein
the image conversion apparatus converts the coded picture so as to reconfigure a relationship between the slice and the rectangular areas included in the coded picture, when a slice boundary and a rectangular area boundary in the coded picture are equal in terms of whether to apply a loop filter and converts the coded picture so as not to change the relationship between the slice and the rectangular areas included in the coded picture when the slice boundary and the rectangular area boundary in the coded picture are not equal in terms of whether to apply a loop filter.

2. The image conversion apparatus of claim 1, wherein the image conversion apparatus codes a flag indicating a possibility that the slice includes two or more rectangular areas in such a manner that the flag indicates a possibility that the slice includes two or more rectangular areas, and codes a flag that indicates whether to include an entry point indicating a starting byte position of the second and subsequent rectangular areas included in the slice, into a picture parameter set for setting a parameter of a picture.

* * * * *